(12) United States Patent
Miyamoto et al.

(10) Patent No.: US 9,351,369 B2
(45) Date of Patent: May 24, 2016

(54) LEAKAGE CURRENT DETECTION CIRCUIT, SEMICONDUCTOR APPARATUS, LED ILLUMINATION APPARATUS, AND VEHICLE

(71) Applicants: Rohm Co., Ltd., Kyoto (JP); HONDA MOTOR CO., LTD., Tokyo (JP)

(72) Inventors: Kouji Miyamoto, Kyoto (JP); Masaaki Nakayama, Kyoto (JP); Akira Aoki, Kyoto (JP); Koji Okamoto, Saitama (JP); Masaharu Ando, Saitama (JP); Yosuke Tsuchiya, Saitama (JP)

(73) Assignees: Rohm Co., Ltd., Kyoto (JP); Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 13/970,666

(22) Filed: Aug. 20, 2013

(65) Prior Publication Data

US 2014/0055031 A1  Feb. 27, 2014

(30) Foreign Application Priority Data

Aug. 21, 2012 (JP) ................. 2012-182494

(51) Int. Cl.
H05B 33/08 (2006.01)
(52) U.S. Cl.
CPC ........ *H05B 33/0887* (2013.01); *H05B 33/0809* (2013.01); *H05B 33/0878* (2013.01)

(58) Field of Classification Search
CPC .......... H05B 33/0887; H05B 33/0884; H05B 33/0875; H05B 33/0878; H05B 33/0803; H05B 33/0809; H05B 33/0815
See application file for complete search history.

(56) References Cited

U.S. PATENT DOCUMENTS

| | | | | | |
|---|---|---|---|---|---|
| 5,982,197 | A | * | 11/1999 | Ono | H03K 19/0963 326/95 |
| 7,911,263 | B2 | * | 3/2011 | Guo | H03K 17/0822 324/522 |
| 8,717,058 | B2 | * | 5/2014 | Fukami | G01R 31/2642 324/762.01 |
| 2004/0155604 | A1 | | 8/2004 | Kobayashi | |
| 2012/0001546 | A1 | | 1/2012 | Takeuchi et al. | |

FOREIGN PATENT DOCUMENTS

| | | |
|---|---|---|
| JP | 2004-179228 | 6/2004 |
| JP | 2008-213813 | 9/2008 |
| JP | 2011-51381 | 3/2011 |
| JP | 2012-011970 | 1/2012 |

\* cited by examiner

*Primary Examiner* — Jung Kim
(74) *Attorney, Agent, or Firm* — Fish & Richardson P.C.

(57) ABSTRACT

A leakage current detection circuit detects a switch current flowing in a switch which is targeted for leakage monitoring, and generates a detection signal to prohibit operation of a control target circuit which is targeted for control when the switch current does not reach a predetermined threshold value.

16 Claims, 11 Drawing Sheets

LEAKAGE CURRENT DETECTION CIRCUIT, SEMICONDUCTOR APPARATUS, LED ILLUMINATION APPARATUS, AND VEHICLE

CROSS-REFERENCE TO RELATED APPLICATIONS

This application is based on the following Japanese Patent Application, and the contents of which are hereby incorporated by reference:

(1) Japanese Patent Application No. 2012-182494 (the filing date: Aug. 21, 2012)

BACKGROUND OF THE INVENTION

1. Field of the Invention

The present invention relates to a leakage current detection circuit, a semiconductor apparatus that integrates the leakage current detection circuit, an LED illumination apparatus, and a vehicle.

2. Description of Related Art

In recent years, as a vehicle-mounted light that is mounted on a vehicle, a motorcycle and the like, an LED light using an LED as a light source is underway to practical use. An LED light is excellent in power consumption and endurance time compared with a conventional halogen light and the like.

In such an LED light, to keep brightness of the LED constant, an LED drive circuit for keeping an electric current flowing in the LED constant is required.

As prior art related to the above description, there is JP-A-2011-51381.

But, a moving body which mounts an LED light is used outdoors usually; therefore because of external factors such as a weather and the like, there is a likelihood that an operation switch to short-circuits. Especially, in a motorcycle, switches such as a head light and the like are near a hand lever; therefore, there is a likelihood that these become wet in rain to produce a leakage current and the LED drive circuit malfunctions. In a case where a malfunction occurs, there is a likelihood that for example, the light is erroneously turned on to consume electric power wastefully. Because of this, a mechanism for suitably detecting a leakage current is required.

SUMMARY OF THE INVENTION

In light of the above problems found by the inventors of the present application, it is an object of the present invention to provide a leakage current detection circuit that is able to detect a leakage current suitably, a semiconductor apparatus that integrates the leakage current detection circuit, an LED illumination apparatus, and a vehicle.

To achieve the above object, a leakage current detection circuit according to the present invention detects a switch current flowing in a switch which is targeted for leakage monitoring, and generates a detection signal to prohibit operation of a control target circuit which is targeted for control when the switch current does not reach a predetermined threshold value.

Other features, elements, steps, advantages, and characteristics of the present invention will become more apparent from the following detailed description of preferred embodiments and the relevant attached drawings.

DETAILED DESCRIPTION OF PREFERRED EMBODIMENTS

Embodiment 1

LED Illumination Apparatus

Figure 1:
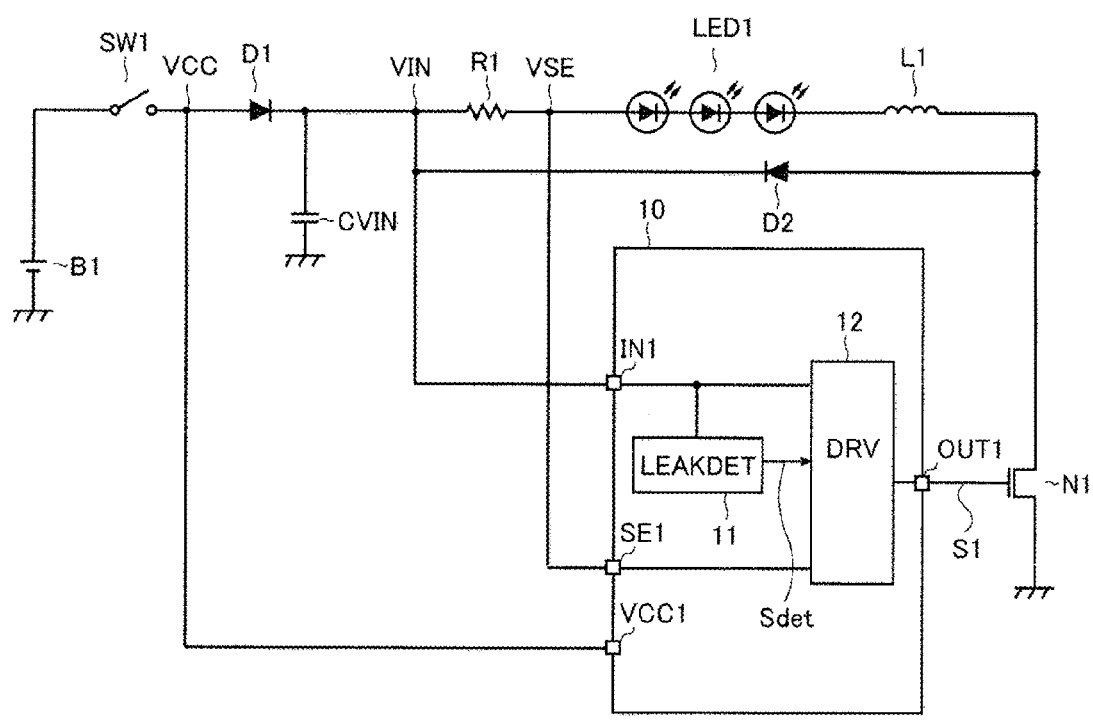
FIG. 1 is a block diagram showing a semiconductor apparatus that includes a leakage current detection circuit according to a first embodiment.

FIG. 1 is a circuit diagram that shows a driver IC 10 (semiconductor apparatus) according to a first embodiment of the present invention and a structural example of an LED illumination apparatus that has the driver IC 10.

The LED illumination apparatus according to the present structural example has: a battery B1; a switch SW1; a diode D1; a capacitor CVIN; a resistor R1; a light emitting diode LED1 (load); a coil L1; a diode D2; an N channel type MOS field effect transistor N1 (hereinafter, called a "transistor N1"); and the driver IC 10.

In the meantime, the driver IC 10 is a monolithic semiconductor integrated circuit apparatus that integrates: a leakage current detection circuit 11; and a drive circuit 12 (control target circuit). Besides, to perform electrical connection with outside, the driver IC 10 has an external terminal IN1, an external terminal SE1, an external terminal VCC1, and an external terminal OUT1.

A connection form of each component explained above is described. A negative terminal of the battery B1 is connected to a ground terminal. A positive terminal of the battery B1 is connected to a first terminal of the switch SW1. A second terminal of the switch SW1 is connected to an anode of the diode D1. A cathode of the diode D1 is connected to a first terminal of the resistor R1.

A first terminal of the capacitor CVIN is connected to the ground terminal. A second terminal of the capacitor CVIN is connected to a connection node between the cathode of the diode D1 and the first terminal of the resistor R1. A second terminal of the resistor R1 is connected to an anode of the light emitting diode LED1. A cathode of the light emitting diode LED1 is connected to a first terminal of the coil L1. A second terminal of the coil L1 is connected to a drain of the transistor N1.

An anode of the diode D2 is connected to a connection node between the second terminal of the coil L1 and the drain of the transistor N1. A cathode of the diode D2 is connected to the connection node between the cathode of the diode D1 and the first terminal of the resistor R1. A gate of the transistor N1 is connected to the external terminal OUT1. A source of the transistor N1 is connected to the ground terminal.

The external terminal N1 is connected to the connection node between the cathode of the diode D1 and the first terminal of the resistor R1. Besides, the external terminal IN1 is connected to the leakage current detection circuit 11 and the drive circuit 12 in the driver IC 10. The external terminal SE1 is connected to a connection node between the second terminal of the resister R1 and the anode of the light emitting diode LED1. Besides, the external terminal SE1 is connected to the drive circuit 12 in the driver IC 10. The external terminal VCC1 is connected to a connection node between a second terminal of the switch SW1 and the anode of the diode D1.

The leakage current detection circuit 11 is connected to the drive circuit 12. Besides, the leakage current detection circuit 11 has a signal route for outputting a detection signal Sdet to the drive circuit 12. The drive circuit 12 is connected to the external terminal IN1 and the external terminal OUT1.

Next, operation of the LED illumination apparatus having the above structure is described in detail. In the meantime, in the following description, a voltage appearing at a connection node between the second terminal of the switch SW1 and the anode of the diode D1 is indicated by VCC, a voltage appearing at the connection node between the cathode of the diode D1 and the first terminal of the resistor R1 is indicated by VIN, and a voltage appearing at a connection node between the second terminal of the resistor R1 and the anode of the light emitting diode LED1 is indicated by VSE; in this way, each node voltage is indicated by a reference symbol.

First, operation with the switch SW1 kept in an on-state is described. In a case where the switch SW1 is turned on, electric power supply is started by the battery B1, and soon the voltage VIN becomes larger than an operation enable voltage of the drive circuit 12. The drive circuit 12 receiving the supply of the voltage VIN generates a potential difference, which is larger than an on-threshold voltage of the transistor N1, between the source and gate of the transistor N1.

As a result of this, the transistor N1 is turned on, whereby the source and drain of the transistor N1 are short-circuited to each other. Accordingly, the light emitting diode LED1 emits light by means of an electric current that flows via the diode D1 and the resistor R1. Besides, to keep the electric current flowing in the light emitting diode LED1 constant, the drive circuit 12 performs on/off control of the transistor N1 in accordance with a change of the voltage VSE. In this way, a light emission amount of the light emitting diode LED1 is kept constant.

In the above state, if the switch SW1 is turned off, the electric current is flowed backward by the coil L1 and the diode D2, and decreases gradually. As a result of this, the light emission of the light emitting diode LED1 stops.

Next, operation in the driver IC 10 is described.

The leakage current detection circuit 11 monitors the voltage VIN input from the external terminal IN1. And, in a case where the voltage VIN is larger than a predetermined threshold value voltage, the leakage current detection circuit 11 instructs the drive circuit 12 to perform the light emission and dimming control of the light emitting diode LED1. Besides, in a case where the voltage VIN is not larger than the predetermined threshold value voltage, the leakage current detection circuit 11 instructs the drive circuit 12 not to perform the light emission and dimming control of the light emitting diode LED1.

More specifically, the leakage current detection circuit 11 changes a logic level of the detection signal Sdet to be output to the drive circuit 12 in accordance with a magnitude of the voltage VIN. In the meantime, the above threshold value voltage is decided beforehand based on the operation enable voltage of the drive circuit 12. For example, in a case where the operation enable voltage is 6 V, a voltage slightly lower than this voltage is decided as the threshold value voltage.

Figure 3:
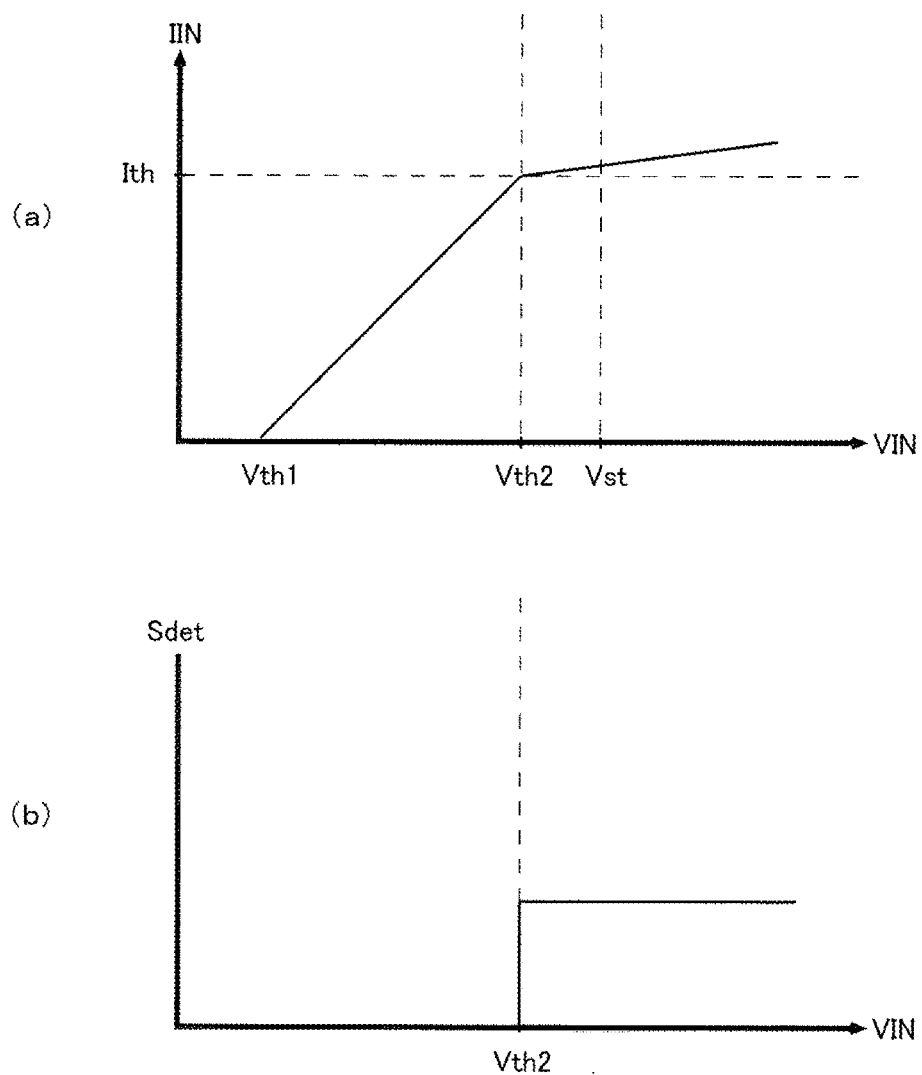
FIG. 3 is a graph showing a relationship among a switch current, an input voltage, and a detection signal in the first embodiment.

FIG. 3 is a schematic view for describing an operation example of the leakage current detection circuit 11 according to the present invention. FIG. 3(a) shows a relationship between an electric current IIN (switch current) flowing into the leakage current detection circuit 11 and the voltage VIN (input voltage). FIG. 3(b) shows a relationship between the voltage VIN and the detection signal Sdet.

The vertical axis of FIG. 3(a) indicates the magnitude of the electric current IIN, while the horizontal axis indicates the magnitude of the voltage VIN. The vertical axis of FIG. 3(b) indicates the logic level of the detection signal Sdet, while the horizontal axis indicates the magnitude of the voltage VIN.

In the meantime, Vth1 of FIG. 3(a) is an on-threshold voltage of a transistor N13 (described later) included in the leakage current detection circuit 11. Besides, Vth2 corresponds to the above threshold value voltage. Vst is a lower limit of the operation enable voltage of the drive circuit 12.

In the present embodiment, as shown in FIG. 3(b), at a time point where the voltage VIN exceeds the threshold value voltage Vth2, the detection signal Sdet changes from Low to High. The drive circuit 12 decides whether to perform control of the transistor N1 or not in accordance with High/Low of the detection signal Sdet.

Besides, in a case where the voltage VIN does not exceed the threshold value voltage Vth2, the leakage current detection circuit 11 regards the electric current IIN flowing into the leakage current detection circuit 11 as a leakage current and operates to absorb the leakage current. Next, details of the driver IC 10 for performing the above detection and absorption operations are described.

<Driver IC>

Figure 2:
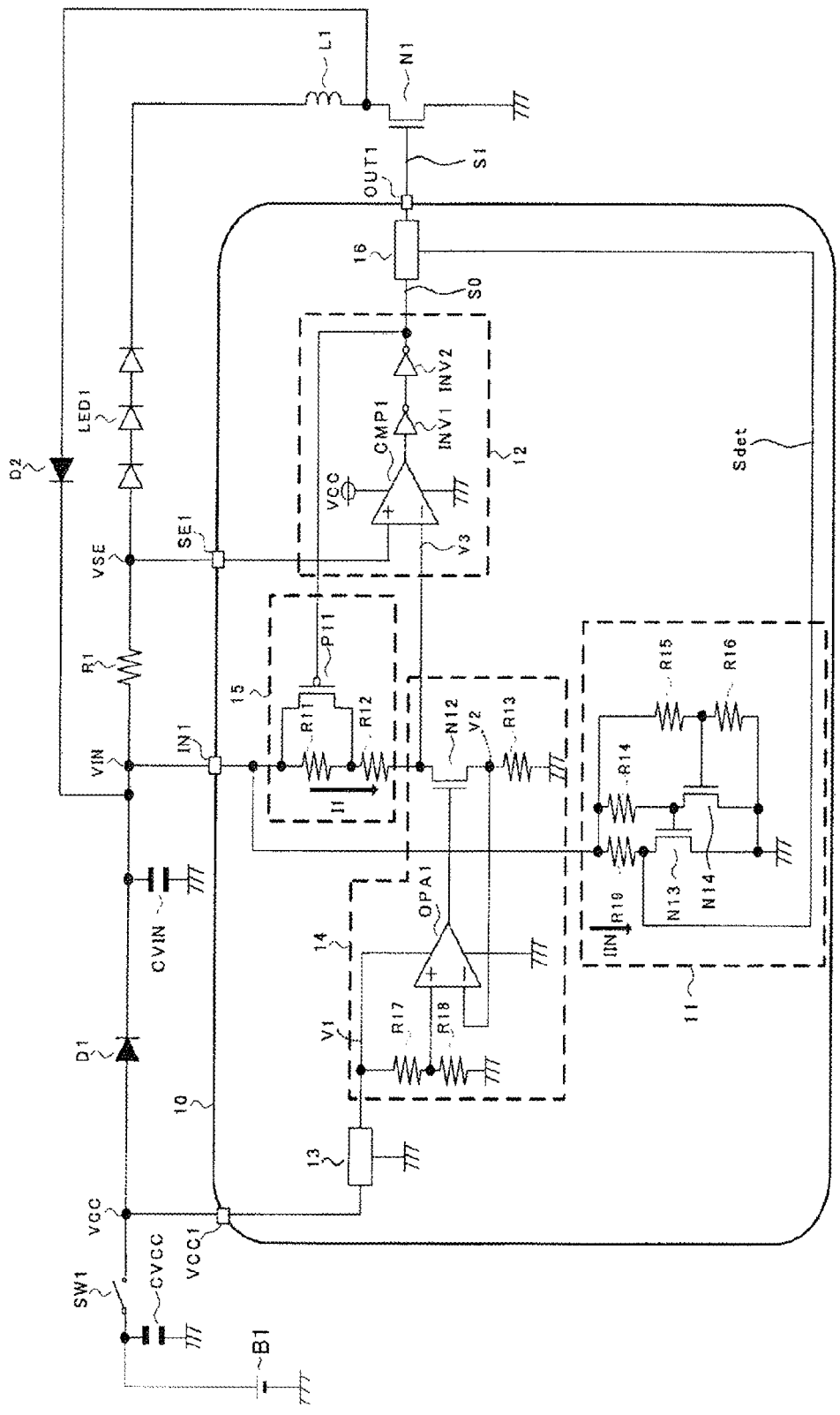
FIG. 2 is a circuit diagram showing the leakage current detection circuit according to the first embodiment.

FIG. 2 is a circuit diagram that shows a circuit structure of the driver IC 10 according to a first embodiment of the present invention. In the meantime, in FIG. 2, a structure of an apparatus externally connected to the driver IC 10 is the same as FIG. 1; therefore, description is skipped here.

The driver IC 10 according to the present structural example has: the leakage current detection circuit 11; the drive circuit 12; a reference power supply 13; a constant current generation circuit 14; a hysteresis voltage generation circuit 15; and a logic circuit 16.

The leakage current detection circuit 11 has: an N channel type MOS field effect transistor N13 (hereinafter, called a "transistor N13"); an N channel type MOS field effect transistor N14 (hereinafter, called a "transistor N14"); resistors R14 to R16; and a resistor R19. The driver circuit 12 has: a comparator CMP1; an inverter INV1; and an inverter INV2.

The constant current generation circuit 14 has: an operational amplifier OPA1; a resistor R13; a resistor R17; a resistor R18; and an N channel type MOS field effect transistor N12 (hereinafter, called a "transistor N12"). The hysteresis voltage generation circuit 15 has: a resistor R11; a resistor R12; and a P channel type MOS field effect transistor P11 (hereinafter, called a "transistor P11").

A connection form of each component explained above is described. First, describing the reference power supply 13 and the constant current generation circuit 14, an input terminal of the reference power supply 13 is connected to the external terminal VCC1. A first terminal of the resistor R17 is connected to an output terminal of the reference power supply 13. A second terminal of the resistor R17 is connected to a first terminal of the resistor R18. A second terminal of the resistor R18 is connected to the ground terminal.

A non-inverting input terminal of the operational amplifier OPA1 is connected to a connection node between the second terminal of the resistor R17 and the first terminal of the resistor R18. An inverting input terminal of the operational amplifier OPA1 is connected to a connection node between a source of the transistor N12 and a first terminal of the resistor R13. An output terminal of the operational amplifier OPA1 is connected to a gate of the transistor N12. A second terminal of the resistor R13 is connected to the ground terminal. A drain of the transistor N12 is connected to a second terminal of the resistor R12.

Next, describing the hysteresis voltage generation circuit 15, a first terminal of the resistor R12 is connected to a second terminal of the resistor R11. A first terminal of the resistor R11 is connected to the external terminal IN1.

A source of the transistor P11 is connected to a connection node between the second terminal of the resistor R11 and the first terminal of the resistor R12. A drain of the transistor P11 is connected to a connection node between the first terminal of the resistor R11 and the external terminal IN1. A gate of the transistor P11 is connected to a connection node between an output terminal of the inverter INV2 and a first input terminal of the logic circuit 16.

Next, describing the drive circuit 12, a non-inverting input terminal of the comparator CMP1 is connected to the external terminal SE1. An inverting input terminal of the comparator CMP1 is connected to a connection node between the second terminal of the resistor R12 and the drain of the transistor N12. An output terminal of the comparator CMP1 is connected to the first input terminal of the logic circuit 16 via the inverter INV1 and the inverter INV2.

Next, describing the leakage current detection circuit 11, a first terminal of the resistor R14 (second resistor), a first terminal of the resistor R15 (third resistor), and a first terminal of the resistor R19 (first resistor) are connected to a connection node between the external terminal IN1 and the resistor R11.

A second terminal of the resistor R19 is connected to a drain of the transistor N13 (first transistor). A second terminal of the resistor R14 is connected to a drain of the transistor N14 (second transistor). A source of the transistor N13 is connected to the ground terminal. A gate of the transistor N13 is connected to a connection node between the second terminal of the resistor R14 and the drain of the transistor N14.

A source of the transistor N14 is connected to the ground terminal. A gate of the transistor N14 is connected to a connection node between a second terminal of the resistor R15 and a first terminal of the resistor R16 (fourth resistor). A second terminal of the resistor R16 is connected to the ground terminal.

Describing the logic circuit 16, a second input terminal of the logic circuit 16 is connected to a connection node between the second terminal of the resistor R19 and the drain of the transistor N13. An output terminal of the logic circuit 16 is connected to the external terminal OUT1.

Next, operation of the driver IC 10 having the above structure is described in detail. In the meantime, in the following description, a voltage generated by the reference power supply 13 is indicated by V1, a voltage appearing at the connection node between the drain of the transistor N12 and the first terminal of the resistor R13 is indicated by V2, and a voltage appearing at a connection node between the source of the transistor N12 and the second terminal of the resistor R12 is indicated by V3; in this way, each node voltage is indicated by a reference symbol.

First, operations of the reference power supply 13 and constant current generation circuit 14 are described. The reference power supply 13 generates the voltage V1 (e.g., 5 V), that is, a constant voltage, from the changing voltage VCC, and supplies the voltage to the constant current generation circuit 14.

The constant current generation circuit 14 uses the voltage V1 to make the hysteresis voltage generation circuit 15 generate an electric current I1 that is a constant current. More specifically, the operational amplifier OPA1 included in the constant current generation circuit 14 performs on-off control of the transistor. N12 connected to the output terminal such that a voltage applied to the non-inverting input terminal and a voltage applied to the inverting input terminal become equal to each other. In this way, the voltage V2 is kept constant (e.g., 6 V), and the electric current I1 becomes a constant current (e.g., 6 mA).

Next, operation of the drive circuit 12 is described. The drive circuit 12 is an electric current control circuit that keeps the electric current flowing in the light emitting diode LED1 constant. More specifically, the drive circuit 12 decides High/Low of a control signal S0 in accordance with the voltage VSE and the voltage V3.

The voltage V3 is applied to an inverting input terminal of the comparator CMP1. The voltage VSE is applied to a non-inverting input terminal of the comparator CMP1. The comparator CMP1 compares the two voltages with each other to output the control signal S0. The control signal S0 goes High in a case where the voltage VSE is larger than the voltage V3, and goes Low in a case where the voltage VSE is smaller than the voltage V3. According to this, in a case where the voltage VSE rises to a predetermined voltage, the transistor N1 is turned on, and in a case where the voltage VSE declines to a predetermined voltage, the transistor N1 is turned off.

Next, operation of the hysteresis voltage generation circuit 15 is described. The control signal S0 described above is input into the gate of the transistor P11 of the hysteresis voltage generation circuit 15. In a case where the control signal S0 is Low, the transistor P11 is turned on. According to this, an electric current flows in the transistor P11 that has a resistance value smaller than the resistor R11; therefore, the voltage V3 rises.

On the other hand, in a case where the control signal S0 is High, the transistor P11 is turned off, and an electric current flows in the resistor R11. According to this, the voltage V3 declines compared with the on-state. As described above, the hysteresis voltage generation circuit 15 turns on/off the transistor P11 in accordance with the change in the voltage VSE to control the voltage V3. By repeating this, the light emission amount of the light emitting diode LED1 is kept constant.

Next, operation of the leakage current detection circuit 11 is described. The leakage current detection circuit 11 makes the electric current IN flow to the ground terminal in a case where the voltage VIN does not exceed the threshold value voltage Vth2, and makes the detection signal Sdet go Low. The leakage current detection circuit 11 makes the detection signal Sdet go High in a case where the voltage VIN exceeds the threshold value voltage Vth2. Here, the value of the threshold value voltage Vth2 is suitably variable in accordance with an upper limit (Ith) of a leakage current to be absorbed.

For example, it is assumed that a leakage route occurs because of an influence of rain and the like despite an off-state of the switch SW1. In this case, electric charges are stored into the capacitor CVIN by a leakage current, and the voltage VIN rises.

As a result of this, in the leakage current detection circuit 11 for detecting the voltage VIN, a voltage is applied to the gate of the transistor N13. In the meantime, at this time, a voltage is also applied to gate of the transistor N14; but, the voltage is adjusted to become minute by means of resistance voltage division by the resistor R15 and the resistor R16.

If the voltage VIN keeps rising, a potential difference higher than the on-threshold voltage (Vth1 of FIG. 3) of the transistor N13 occurs between the source and gate of the transistor N13, whereby the transistor N13 is turned on. In this way, the electric current IIN flows in the resistor R19 and the transistor N13. In other words, the leakage current is discharged to the ground terminal via the transistor N13.

Here, if the leakage does not occur and the switch SW1 is short-circuited by a user's operation, the voltage VIN further keeps rising. In this case, a potential difference higher than an on-threshold voltage of the transistor N14 occurs between the source and gate of the transistor N14, whereby the transistor N14 is turned on. In this way, the electric current IIN flows in the resistor R14 and the transistor N14.

As a result of this, the potential difference between the source and gate of the transistor N13 becomes lower than the on-threshold voltage of the transistor N13, whereby the transistor N13 is turned off. In other words, the route, through which the electric current IIN is discharged to the ground terminal via the transistor N13, is shut down. And, if the voltage VIN reaches the operation enable voltage of the drive circuit 12, it becomes possible to perform the light emission and dimming control of the light emitting diode LED1.

In the meantime, to perform the above operation, as the resistors R14-R16, resistors having a resistance value larger than the resistor R19 are used. Because of this, as shown in FIG. 3, in a state where the voltage VIN exceeds the threshold value voltage Vth2, that is, in a state where the electric current TIN flows in the resistors R14-R16, the rising of the electric current IIN becomes moderate.

From the above operation, an on-threshold voltage (Vth2 of FIG. 3) of the leakage current detection circuit 11 is decided by means of the following calculation formula. In the meantime, the following RON indicates an on-resistance value of the transistor N13.

$$Vth2 = (R19 + RON) \times IIN \times R16 / (R15 + R16)$$

Next, operation of the logic circuit 16 is described. In a case where the detection signal Sdet input from the leakage current detection circuit 11 is Low, that is, in a case where the voltage VIN does not reach the threshold value voltage Vth2, even if the control signal S0 is input from the drive circuit 12, the logic circuit 16 invalidates the control signal S0 (always Low). In this way, it is prevented that the light emitting diode LED1 is erroneously turned on by the leakage current.

Besides, in a case where the detection signal Sdet input from the leakage current detection circuit 11 is High, that is, in a case where the voltage VIN reaches the threshold value voltage Vth2, if the control signal S0 is input from the drive circuit 12, the logic circuit 16 outputs the control signal S0 as a control signal S1 to the external terminal OUT1. According to this, in a case where the voltage VIN reaches the operation enable voltage, it becomes possible to perform the light emission and dimming control of the light emitting diode LED1.

According to the above-described leakage current detection circuit 11 in the present embodiment, in a state where the voltage VIN does not reach the operation enable voltage of the drive circuit 12 and the electric current UN is inferable as a leakage current, it is possible to discharge the electric current IIN. Besides, it is possible to prohibit the operation of the drive circuit 12 and prevent the light emitting diode LED1 from being erroneously turned on.

Embodiment 2

In the embodiment 1 described above, it is possible to detect a leakage current and absorb it; but, in a case where the leakage current occurs over a long time, there is a likelihood that a large amount of electric power is consumed and the battery is exhausted. Besides, there is a likelihood that unevenness occurs among the threshold value voltages because of a difference among the individual on-resistances of the respective transistors. Accordingly, a second embodiment of the present invention employs the following structure.

<LED Illumination Apparatus>

Figure 4:
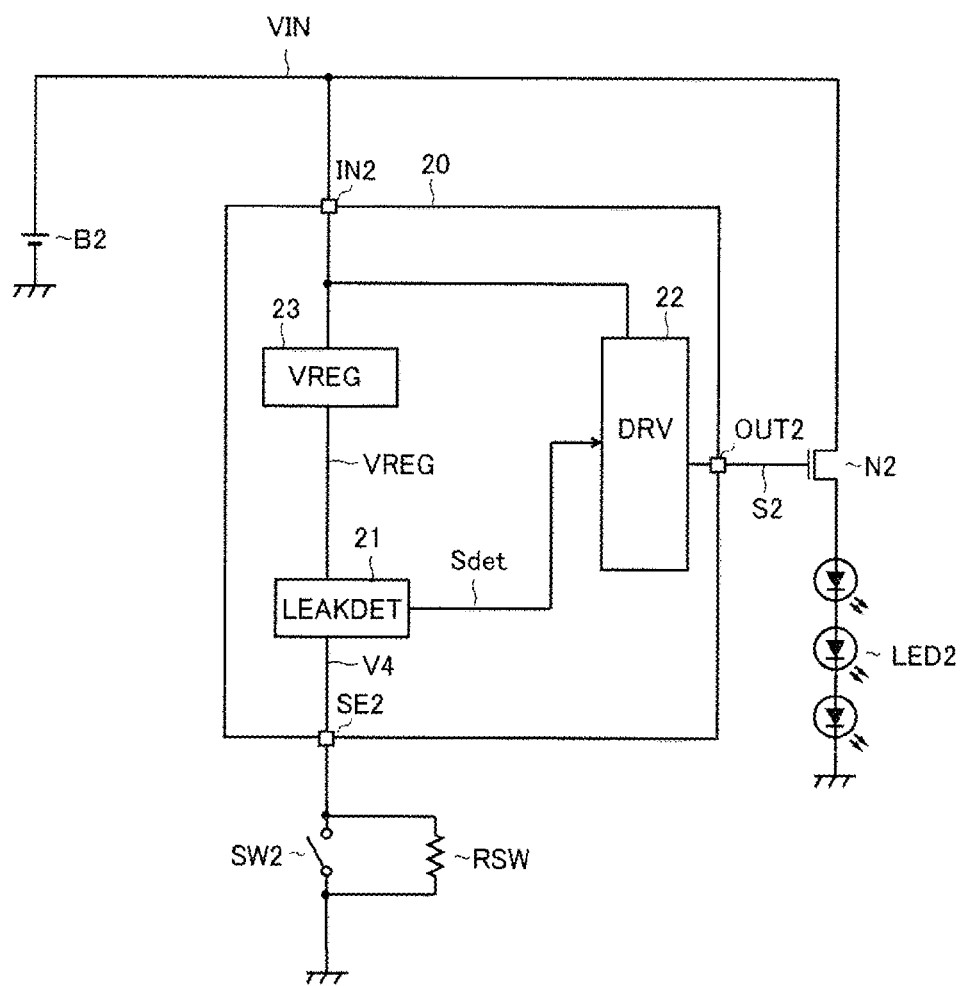
FIG. 4 is a block diagram showing a semiconductor apparatus that includes a leakage current detection circuit according to a second embodiment.

FIG. 4 is a circuit diagram that shows a driver IC 20 (semiconductor apparatus) according to the second embodiment of the present invention and a structural example of an LED illumination apparatus that includes the driver IC 20.

The LED illumination apparatus according to the present structural example has: a battery B2; the driver IC 20; an N channel type MOS field effect transistor N2 (hereinafter, called a "transistor N2); a light emitting diode LED2 (load); and a switch SW2.

In the meantime, the driver IC 20 is a monolithic semiconductor integrated circuit apparatus that integrates: a leakage current detection circuit 21; a drive circuit 22 (control target circuit); and a constant voltage source 23. Besides, to perform electrical connection with outside, the driver IC 10 has an external terminal IN2, an external terminal SE2, and an external terminal OUT2.

The external terminal IN2 is an input terminal for the voltage VIN. The external terminal SE2 is a connection terminal for the switch SW2. The external terminal OUT2 is an output terminal for a control signal S2.

A connection form of each component explained above is described. A negative terminal of the battery B2 is connected to the ground terminal. A positive terminal of the battery B2 is connected to a drain of the transistor N2. A source of the transistor N2 is connected to an anode of the light emitting diode LED2. A gate of the transistor N2 is connected to the external terminal OUT2. A cathode of the light emitting diode LED2 is connected to the ground terminal.

The external terminal IN2 is connected to a connection node between the positive terminal of the battery B2 and the drain of the transistor N2. The external terminal SE2 is connected to a second terminal of the switch SW2. A first terminal of the switch SW2 is connected to the ground terminal.

In the driver IC 20, the constant voltage source 23 is connected to the external terminal IN2 and the leakage current detection circuit 21. The leakage current detection circuit 21 is connected to the external terminal SE2. Besides, the leakage current detection circuit 21 has a signal route for outputting the detection signal Sdet to the drive circuit 22. The drive circuit 22 is connected to the external terminal IN2, the constant voltage source 23, and the external terminal OUT2.

Next, operation of the LED illumination apparatus having the above structure is described in detail. In the meantime, in the following description, a voltage applied to the external terminal IN2 is indicated by VIN, a voltage applied to the external terminal SE2 is indicated by V4 (input voltage), and a voltage generated by the constant voltage source 23 is indicated by VREG; in this way, each node voltage is indicated by a reference symbol.

First, operation with the switch SW2 kept in an on-state is described. In a case where the switch SW2 is turned on, the leakage current detection circuit 21 brings the detection signal Sdet to Low by means of operation later described. The drive circuit 22 receiving the detection signal Sdet generates a potential difference, which is larger than an on-threshold voltage of the transistor N2, between the source and gate of the transistor N2.

As a result of this, the transistor N2 is turned on, whereby the source and drain of the transistor N2 are short-circuited to each other. Accordingly, the light emitting diode LED2 emits light by means of an electric current that flows via the transistor N2.

In the meantime, although not shown in FIG. 4, in a case where constant current control of the light emitting diode LED2 is performed, a resistor corresponding to the resistor R1 in FIG. 2 is externally connected to the driver IC 20, and the same constant current control as the above description is performed by the drive circuit 22. In this way, a light emission amount of the light emitting diode LED2 is kept constant.

On the other hand, if the switch SW2 is turned off, the leakage current detection circuit 21 brings the detection signal Sdet to High by means of operation later described. The drive circuit 22 receiving the detection signal Sdet turns off the transistor N2. As result of this, the light emission of the light emitting diode LED2 is stopped.

Next, operation in the driver IC 20 is described.

The constant voltage source 23 generates the voltage VREG (e.g., 5 V), that is, a constant voltage, from the changing voltage VIN, and supplies the voltage to the leakage current detection circuit 21.

The leakage current detection circuit 21 monitors the voltage V4 that changes depending on on/off of the switch SW2 and a leakage. And, in a case where the voltage V4 is lower than a predetermined threshold value voltage, the leakage current detection circuit 21 instructs the drive circuit 22 to perform the light emission and dimming control of the light emitting diode LED2. Besides, in a case where the voltage V4 is larger than the predetermined threshold value voltage, the leakage current detection circuit 21 instructs the drive circuit 22 not to perform the light emission and dimming control of the light emitting diode LED2.

More specifically, the leakage current detection circuit 21 changes the logic level of the detection signal Sdet to be output to the drive circuit 22 in accordance with a magnitude of the voltage V4. In the meantime, the above threshold value voltage is decided beforehand based on a resistance value RSW of a leak resistor occurring in a leakage route of the switch SW2.

Next, details of the leakage current detection circuit 21 for performing the above detection operation are described.

<Leakage Current Detection Circuit>

Figure 5:
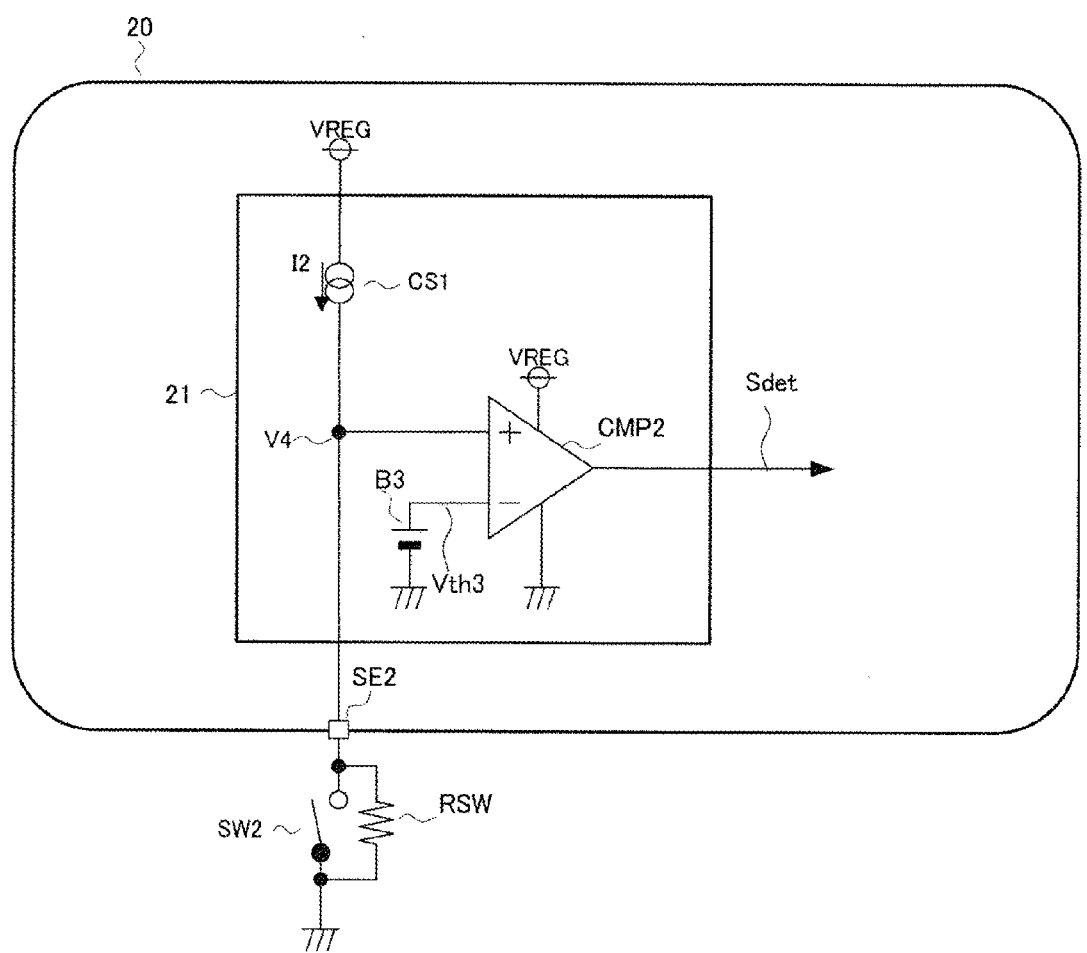
FIG. 5 is a circuit diagram showing the leakage current detection circuit according to the second embodiment.

FIG. 5 is a circuit diagram that shows a circuit structure of the leakage current detection circuit 21 according to the second embodiment of the present invention. In the meantime, in FIG. 5, a structure of an apparatus externally connected to the current detection circuit 21 is the same as FIG. 4; therefore, description is skipped here. Besides, as to details of the drive circuit 22, it is possible to use the same structure as the drive circuit 12 of the embodiment 1; therefore, description is skipped here.

The leakage current detection circuit 21 according to the present structural example has: a constant current source CS1; a comparator CMP2; and a constant voltage source B3.

A connection form of each component explained above is described. An input terminal of the constant current source CS1 is connected to an application terminal for the voltage VREG. An output terminal of the constant current source CS1 is connected to the external terminal SE2.

A non-inverting input terminal of the comparator CMP2 is connected to a connection node between the output terminal of the constant current source CS1 and the external terminal SE2. An inverting input terminal of the comparator CMP2 is connected to a positive terminal of the constant voltage source B3. A negative terminal of the constant voltage source B3 is connected to the ground terminal. An output terminal of the comparator CMP2 is connected, as an output terminal for the detection signal Sdet, to the drive circuit 22.

Next, operation of the leakage current detection circuit 21 having the above structure is described in detail. In the meantime, in the following description, a voltage appearing at the connection node between the output terminal of the constant current source CS1 and the external terminal SE1 is indicated by V4, and a voltage generated by the constant voltage source B3 is indicated by Vth3; in this way, each node voltage is indicated by a reference symbol.

The constant current source CS1 uses the voltage VREG to generate an electric current I2 (switch current) that is a constant current. The electric current I2 is output from the output terminal of the constant current source CS1 via the external terminal SE2. In this way, the voltage V4 occurs at the external terminal SE2 in accordance with the on/off of the switch SW2 and a leakage.

The constant voltage source B3 generates a threshold value voltage Vth3, that is, a constant voltage, at its positive terminal. In the meantime, a value of the threshold value voltage Vth3 is a value obtained by multiplying a threshold resistance value Rth (threshold value for determining whether the switch SW2 is short-circuited or not) by the electric current I2. For example, in a case where the threshold resistance value Rth is 20Ω and the electric current I2 is 1 mA, the threshold value voltage Vth3 becomes 20 mV.

The above threshold value voltage Vth3 is applied to the inverting input terminal of the comparator CMP2. The voltage V4 is applied to the non-inverting input terminal of the comparator CMP2. The comparator CMP2 compares the two voltages with each other to change the logic level of the detection signal Sdet.

Figure 6:
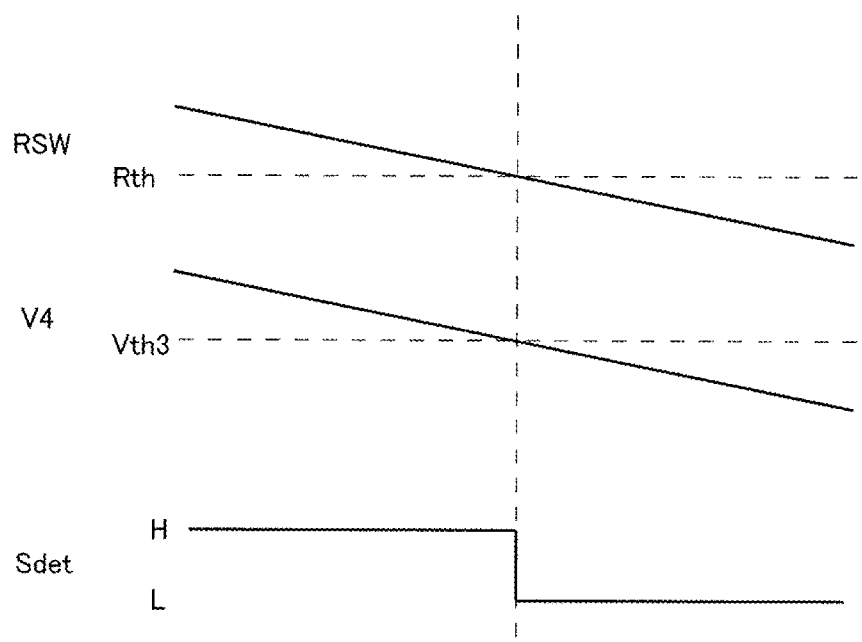
FIG. 6 is a graph showing a relationship among a leak resistance, an input voltage, and a detection signal in the second embodiment.

FIG. 6 is a schematic view for describing an operation example of the leakage current detection circuit 21 according to the present invention. FIG. 6 shows a relationship among the leak resistance value RSW (top stage), the voltage V4 (middle stage), and the detection signal Sdet (bottom stage). The detection signal Sdet goes High in a case where the voltage V4 is larger than the threshold value voltage Vth3, and goes Low in a case where the voltage V4 is smaller than the threshold value voltage Vth3.

As shown in FIG. 6, in a case where the leak resistance value RSW is lower than the threshold resistance value Rth and accordingly the voltage V4 is lower than the threshold value voltage Vth3, the detection signal Sdet is brought to Low. On the other hand, in a case where the leak resistance value RSW is larger than the threshold resistance value Rth and accordingly the voltage V4 is larger than the threshold value voltage Vth3, the detection signal Sdet is brought to High. The drive circuit 22 decides in accordance with High/

Low of the detection signal Sdet whether to perform the light emission and dimming control of the light emitting diode LED2 or not.

In a case where the detection signal Sdet is High, the drive circuit 22 receiving the detection signal stops the light emission and dimming control of the light emitting diode LED2. In a case where the detection signal Sdet is Low, the drive circuit 22 receiving the detection signal performs the light emission and dimming control of the light emitting diode LED2.

Summing up the above description, there are three following patterns in accordance with the state of the switch SW2.

(A) State Where the Switch SW2 is Opened and No Leakage Occurs

Both the switch SW2 and the leak resistance value RSW have a high impedance. Accordingly, the detection signal Sdet goes High; therefore, the drive circuit 12 does not operate.

(B) State Where the Switch SW2 is Opened and a Leakage Occurs

The switch SW2 has a high impedance, however the leak resistance has a low impedance. But, the leak resistance value RSW is equal to or larger than the threshold resistance value Rth; therefore, the detection signal Sdet goes High, and the drive circuit 12 does not operate.

(C) State Where the Switch SW2 is Short-Circuited

The switch SW2 has a low impedance (lower than the threshold resistance value Rth); therefore, irrespective of a leakage, the detection signal Sdet goes Low, and the drive circuit 12 operates.

According to the leakage current detection circuit 21 of the present embodiment described above, even if the voltage V4 declines, it is regarded that a leakage is occurring in the switch SW2 until the voltage V4 becomes lower than the threshold value voltage Vth3. In other words, it is regarded that the switch SW2 is not short-circuited by the user. Because of this, in the above state (B), it is possible to prohibit the operation of the drive circuit 22 and prevent the light emitting diode LED2 from being erroneously turned on.

Besides, in the present embodiment, the structure is employed, in which the leakage current detection circuit 21 does not pull out a leakage current from the battery B2 but only monitors the on/off of the switch SW2 and a leakage. Because of this, if the electric current I2 is set sufficiently small, even if a leakage occurs in the switch SW2, it is possible to avoid a situation in which the leakage current flows into the leakage current detection circuit 11 in large quantities and the battery B2 is exhausted.

<Illumination Apparatus>

Figure 7:
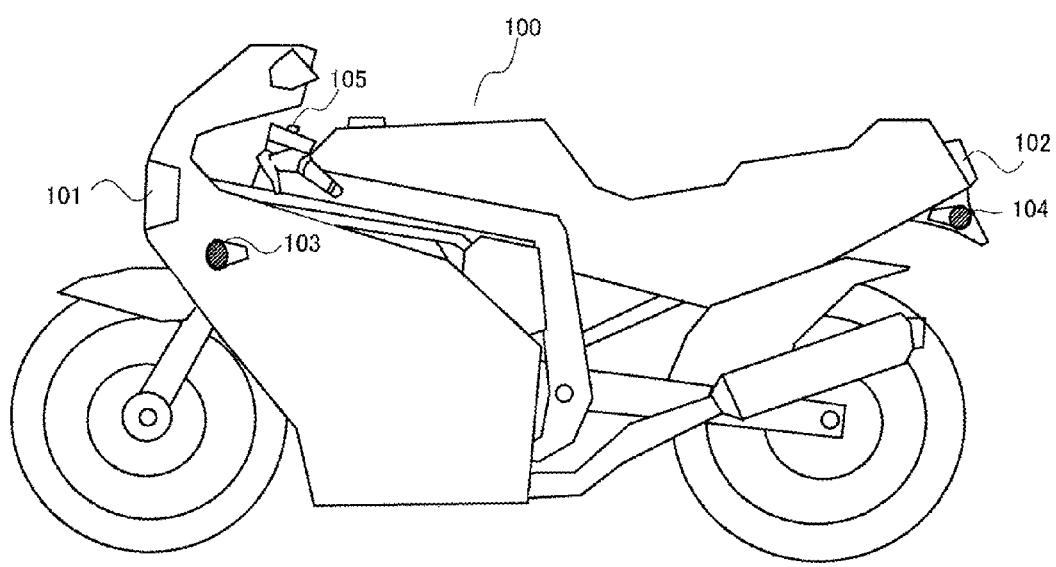
FIG. 7 is a schematic view showing a vehicle that mounts an LED illumination apparatus according to the present invention.
Figure 8:
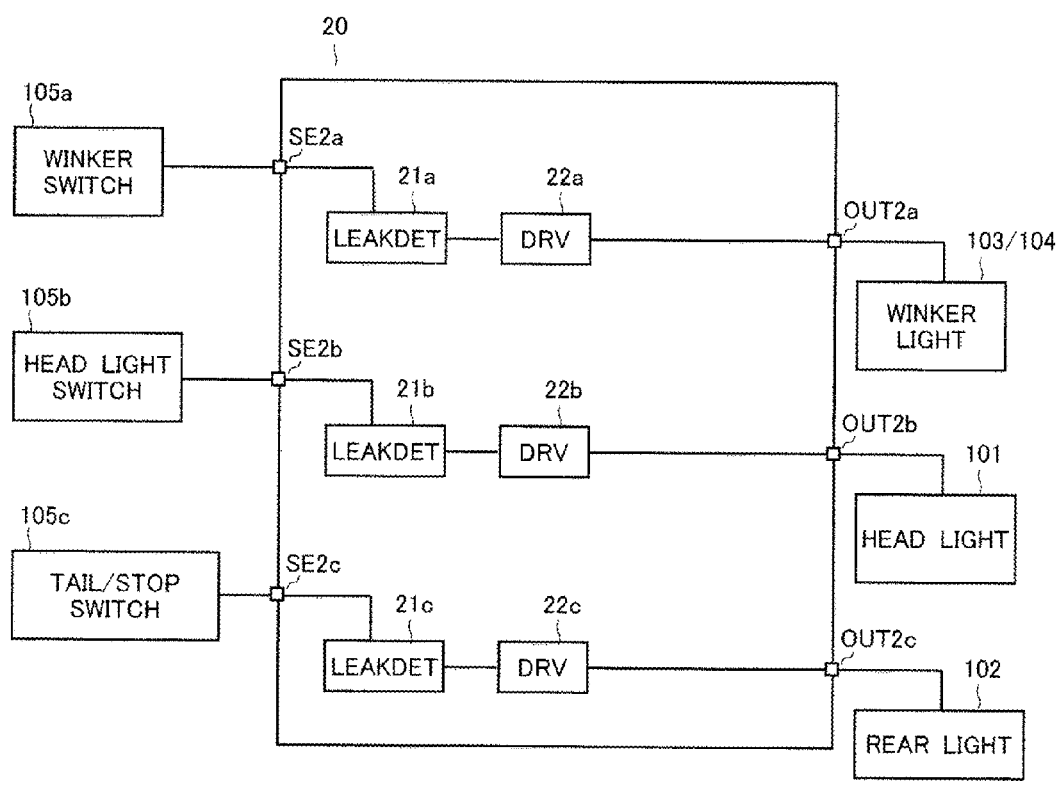
FIG. 8 is a block diagram showing an LED illumination apparatus according to the present invention.

FIG. 7 is an appearance view that shows an appearance of a motorcycle (vehicle) that mounts the LED illumination apparatus according to the second embodiment. FIG. 8 is a block diagram that shows a structural example of the driver IC 20 according to the second embodiment connected to a plurality of switches and lights.

The LED illumination apparatus according to the present structural example has: the driver IC 20; a head light 101; a rear light 102; a winker light 103; a winker light 104; and a switch 105. In the meantime, the switch 105 includes: a winker switch 105a; a head light switch 105b; and a tail/stop switch 105c.

The head light 101 to the winker light 104 have each therein the light emitting diode LED2 shown in FIG. 4. Besides, the above winker switch 105a to the tail/stop switch 105c have each therein the switch SW2 shown in FIG. 4.

The driver IC 20 according to the present structural example has a plurality of the leakage current detection circuits 21 and a plurality of the drive circuits 22. As shown in FIG. 8, a set of the leakage current detection circuit 21 and drive circuit 22 are disposed for a set of switch and light. For example, a leakage current detection circuit 21b and a drive circuit 22b are disposed for the head light switch 105b and the head light 101. According to this, it is possible to detect a leakage current in each switch, and perform drive control of a light corresponding to each switch in accordance with the detection result.

Embodiment 3

In the embodiment 2 described above, there is a problem that in a case where an oxide layer is formed on a surface of the switch SW2 because of time-dependent change and the like, it is hard to remove the oxide layer. If an oxide layer is formed on the switch SW2, the resistance value of the switch SW2 rises at an on-time; therefore, it is desirable to remove the oxide layer. But in the switch SW2, the electric current I2 flowing at the on-time is only a minute current of a few milliamperes to dozens of milliamperes; therefore, it is impossible to remove the oxide layer by means of a large current. Accordingly, a third embodiment of the present invention employs the following structure.

<LED Illumination Apparatus>

Figure 9:
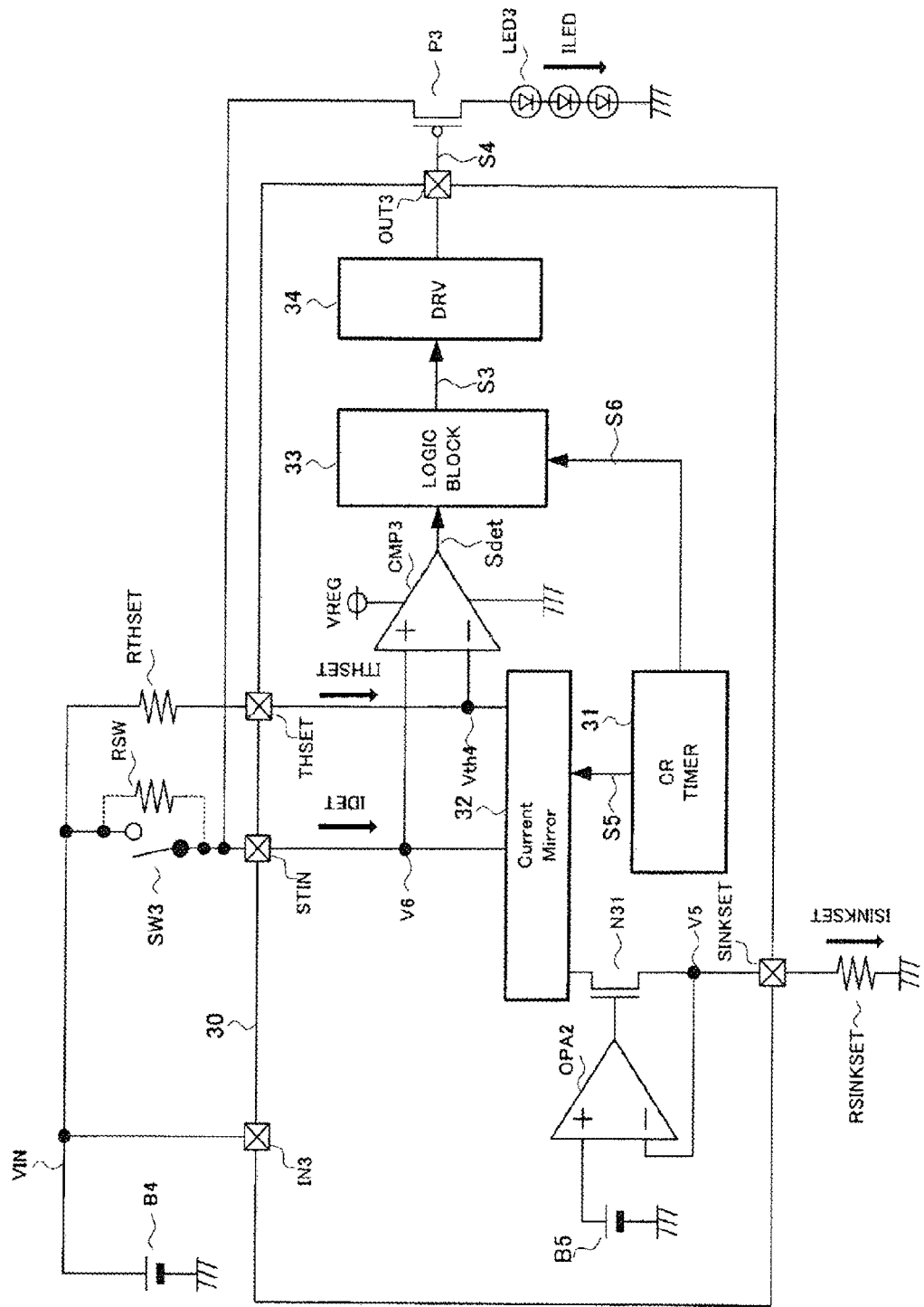
FIG. 9 is a block diagram showing a semiconductor apparatus that includes a leakage current detection circuit according to a third embodiment.

FIG. 9 is a circuit diagram that shows a driver IC 30 (semiconductor apparatus) according to the third embodiment of the present invention and a structural example of an LED illumination apparatus that has the driver IC 30.

The LED illumination apparatus according to the present structural example has: a battery B4; a switch SW3; a resistor RTHSET; the driver IC 30; a P channel type MOS field effect transistor P3 (hereinafter, called a "transistor P3"); a light emitting diode LED3 (load); and a resistor RSINKSET.

In the meantime, the driver IC 30 is a monolithic semiconductor integrated circuit apparatus that integrates: a CR timer 31; a current mirror circuit 32; a logic circuit 33; a drive circuit 34 (control target circuit); a comparator CMP3; an operational amplifier OPA2; a constant voltage source B5; and an N channel type MOS field effect transistor N31 (hereinafter, called a "transistor N31"). Besides, to perform electrical connection with outside, the driver IC 30 has an external terminal IN3, an external terminal STIN, an external terminal THSET, an external terminal OUT3, and an external terminal SINKSET.

The external terminal IN3 is an input terminal for the voltage VIN. The external terminal STIN is a connection terminal for the switch SW3. The external terminal THSET is a connection terminal for the resistor RTHSET. The external terminal OUTS is an output terminal for a control signal S4. The external terminal SINKSET is a connection terminal for the resistor RSINKSET.

A connection form of each component explained above is described. A negative terminal of the battery B4 is connected to the ground terminal. A positive terminal of the battery B4 is connected to the external terminal IN3, a first terminal of the switch SW3, and a first terminal of the resistor RTHSET. A second terminal of the switch SW3 is connected to the external terminal STIN. A second terminal of the resistor RTHSET is connected to the external terminal THSET.

A source of the transistor P3 is connected to a connection node between the second terminal of the switch SW3 and the external terminal STIN. A drain of the transistor P3 is connected to an anode of the light emitting diode LED3. A gate of the transistor P3 is connected to the external terminal OUT3. A cathode of the light emitting diode LED3 is connected to the ground terminal.

A first terminal of the resistor RSINKSET is connected to the external terminal SINKSET. A second terminal of the resistor RSINKSET is connected to the ground terminal.

Next, a connection form of each component in the driver IC 30 is described. A first terminal of the CR timer 31 is connected to a first terminal of the current mirror circuit 32. A second terminal of the CR timer 31 is connected to a first terminal of the logic circuit 33.

A second terminal of the current mirror circuit 32 is connected to the external terminal STIN. A third terminal of the current mirror circuit 32 is connected to the external terminal THSET. A fourth terminal of the current mirror circuit 32 is connected to a drain of the transistor N31.

A source of the transistor N31 is connected to the external terminal SINKSET. A gate of the transistor N31 is connected to an output terminal of the operational amplifier OPA2. A non-inverting input terminal of the operational amplifier OPA2 is connected to a positive terminal of the constant voltage source B5. An inverting input terminal of the operational amplifier OPA2 is connected to a connection node between the source of the transistor N31 and the external terminal SINKSET. A negative terminal of the constant voltage source B5 is connected to the ground terminal.

A non-inverting input terminal of the comparator CMP3 is connected to a connection node between the external terminal STIN and the second terminal of the current mirror circuit 32. An inverting input terminal of the comparator CMP3 is connected to a connection node between the external terminal THSET and the third terminal of the current mirror circuit 32. An output terminal of the comparator CMP3 is connected, as an output terminal for the detection signal Sdet, to a second terminal of the logic circuit 33.

An output terminal of the logic circuit 33 is connected, as an output terminal for a control signal S3, to the drive circuit 34. An output terminal of the drive circuit 34 is connected, as an output terminal for a control signal S4, to the external terminal OUTS.

Next, operation of the LED illumination apparatus having the above structure is described in detail. In the meantime, in the following description, a voltage applied to the external terminal IN3 is indicated by VIN, a voltage appearing at the connection node between the source of the transistor N31 and the external terminal SINKSET is indicated by V5, a voltage appearing at the connection node between the external terminal STIN and the second input terminal of the current mirror circuit 32 is indicated by V6, and a voltage appearing at the connection node between the external terminal THSET and the third input terminal of the current mirror circuit 32 is indicated by Vth4; in this way, each node voltage is indicated by a reference number.

First, operation in the driver IC 30 is described. The constant voltage source B5 generates a constant voltage (e.g., 1 V) and applies the voltage to the non-inverting input terminal of the operational amplifier OPA2. The operational amplifier OPA2 performs on-off control of the transistor N31 connected to the output terminal such that the voltage applied to the non-inverting input terminal and the voltage applied to the inverting input terminal become equal to each other. In this way, the voltage V5 is kept constant, and the electric current ISINKSET becomes a constant current.

The CR timer 31 outputs a control signal S5, that is, a PWM signal, to the current mirror circuit 32. Besides, the CR timer 31 outputs a control signal S6, that is, a PWM signal, to the logic circuit 33. In the meantime, the control signal S5 and the control signal S6 are the same as each other.

The control signal S5 is used in order for the current mirror circuit 32 to decide a timing for pulling in an electric current IDET and an electric current ITHSET. The control signal S6 is used in order for the logic circuit 33 to decide a timing for performing a switchover of High/Low of the control signal S3 (details are described later).

The current mirror circuit 32 uses an electric current ISINKSET generated by the operational amplifier OPA2 to generate the electric current IDET and the electric current ITHSET that are a constant current. In the meantime, the operation of the current mirror circuit 32 is performed in only a case where the control signal S5 input from the CR timer 31 is High and is not performed in a case where the control signal S5 is Low.

The voltage V6 decided by the electric current IDET and the leak resistance value RSW is applied to the non-inverting input terminal of the comparator CMP3. The threshold value voltage Vth4 decided by the electric current ITHSET and the resistance value of the resistor RTHSET is applied to the inverting input terminal of the comparator CMP3. The comparator CMP3 compares the two voltages with each other to change the logic level of the detection signal Sdet.

Figure 10:
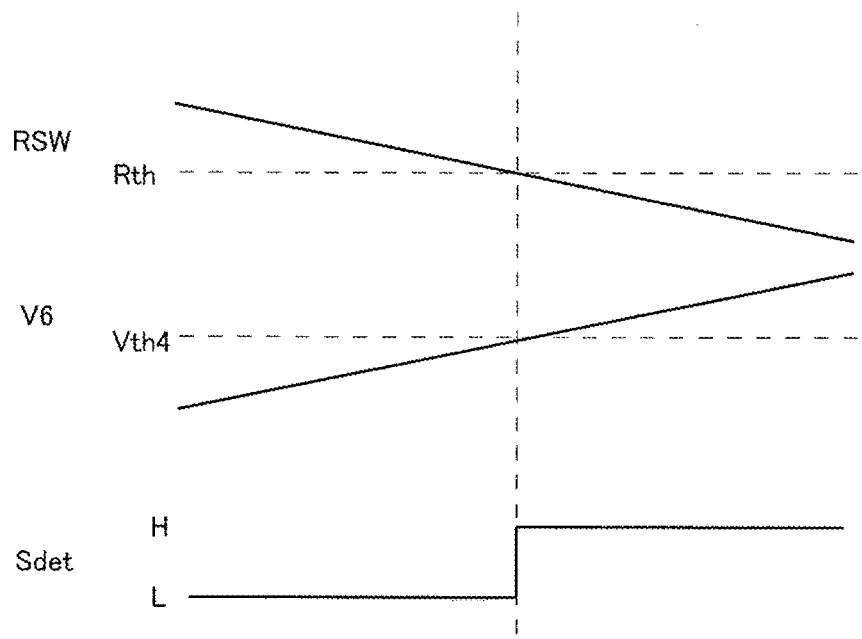
FIG. 10 is a graph showing a relationship among a leak resistance, an input voltage, and a detection signal in the third embodiment.

FIG. 10 is a schematic view for describing an operation example of the comparator CMP3 according to the present invention. FIG. 10 shows a relationship among the leak resistance value RSW (top stage), the voltage V6 (middle stage), and the detection signal Sdet (bottom stage). The detection signal Sdet goes High in a case where the voltage V6 is larger than the threshold value voltage Vth4, and goes Low in a case where the voltage V6 is smaller than the threshold value voltage Vth4.

As shown in FIG. 10, in a case where the leak resistance value RSW is larger than the threshold resistance value Rth and accordingly the voltage V6 is lower than the threshold value voltage Vth4, the detection signal Sdet is brought to Low. On the other hand, in a case where the leak resistance value RSW is lower than the threshold resistance value Rth and accordingly the voltage V6 is larger than the threshold value voltage Vth4, the detection signal Sdet is brought to High. The logic circuit 33 decides High/Low of the control signal S3 in accordance with High/Low of the detection signal Sdet.

In a case where the detection signal Sdet is High, the logic circuit 33 receiving the detection signal Sdet brings the control signal S3 to Low. In a case where the control signal S3 is Low, the drive circuit 34 receiving the control signal S3 brings the control signal S4 to Low. As a result of this, the transistor P3 is turned on, whereby an electric current ILED flows in the light emitting diode LED3.

On the other hand, in a case where the detection signal Sdet is Low, the logic circuit 33 receiving the detection signal Sdet brings the control signal S3 to High. In a case where the control signal S3 is High, the drive circuit 34 receiving the control signal S3 brings the control signal S4 to High. As a result of this, the transistor P3 is turned off, whereby the electric current ILED does not flow in the light emitting diode LED3.

In the meantime, although not shown in FIG. 9, in a case where constant current control of the light emitting diode LED3 is performed, a resistor corresponding to the resistor R1 in FIG. 2 is externally connected to the driver IC 30, and the same constant current control as the above description is performed by the drive circuit 34. In this way, a light emission amount of the light emitting diode LED3 is kept constant.

Figure 11:
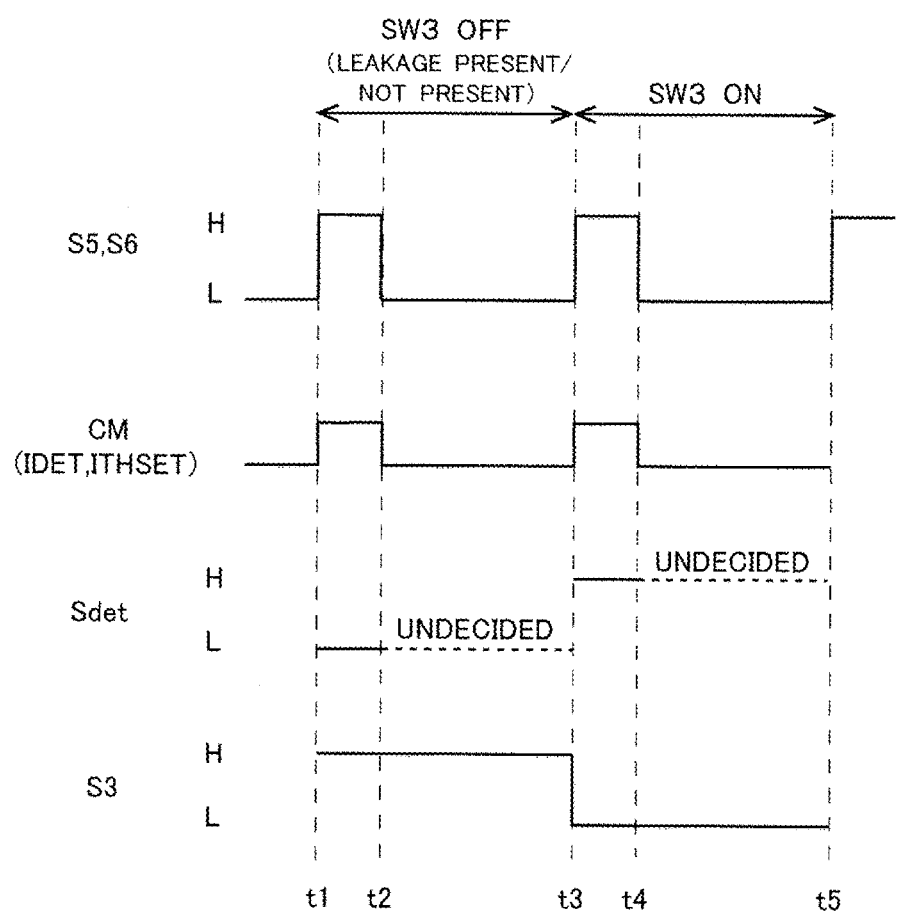
FIG. 11 is a timing chart showing a relationship among a control signal, an input current, and a detection signal in the third embodiment.

Next, a relationship among various signals and electric currents in respective states, where the switch SW3 is in an off-state (inclusive of a leakage being present/leakage not-being present) and where the switch SW3 is in an on-state, is described by using FIG. 11. FIG. 11 is a timing chart that shows a relationship among the control signal S5 and the control signal S6 (first stage), the electric current IDET and electric current ITHSET (second stage) that flow in the current mirror circuit 32, the detection signal Sdet (third stage), and the control signal S3 (fourth stage).

In the meantime, broken lines at t1-t5 indicate timings when High/Low of the control signal S5 and control signal S6 change. The control signal S5 and the control signal S6 change at a constant period. In the example of FIG. 11, t1-t3 is a first period, and t3-t5 is a second period. In the present embodiment, as an example, description is performed assuming that the switch SW3 is turned off at t1; and the switch SW3 is turned on at t3.

First, at t1, when the control signal S5 and the control signal S6 change from Low to High, the current mirror circuit 32 starts to pull in the electric current IDET and the electric current ITHSET. Besides, the logic current 33 decides High/Low of the control signal S3. In the present example, because SW3 is turned off at the time point t1, the detection signal Sdet goes Low; accordingly, the control signal S3 goes High.

Next, at t2, when the control signal S5 and the control signal S6 change from High to Low, the current mirror circuit 32 stops pulling in the electric current IDET and the electric current ITHSET. Besides, irrespective of High/Low of the detection signal Sdet, the logic circuit 33 operates as a latch circuit that holds High/Low of the control signal S3 at the time point t1. In the present example, High is held at the time point t2. In the meantime, the detection signal Sdet is not referred to between t2 and t3; therefore, High/Low may be undecided.

Next, at t3, when the control signal S5 and the control signal S6 change from Low to High, the pulling-in of the electric current IDET and electric current ITHSET is performed again, and the decision of High/Low of the control signal S3 is performed again. In the present example, the SW3 is turned on at the time point t3; therefore, the detection signal. Sdet goes High, and the control signal S3 goes Low.

Next, at t4, when the control signal S5 and the control signal S6 change from High to Low, like during the first period, the pulling-in of the electric current IDET and electric current ITHSET is stopped, and the holding of High/Low of the control signal S3 is performed. By repeating the above operation, the detection of a leakage current and the on-off control of the light emitting diode LED3 are performed.

Even if the voltage V6 rises, the driver IC 30 according to the present embodiment described above regards that a leakage is occurring in the switch SW3 until the voltage V6 becomes larger than the threshold value voltage Vth4. In other words, it is regarded that the switch SW3 is not short-circuited by the user. Because of this, at a leakage occurrence time, it is possible to prohibit the operation of the drive circuit 34 and prevent the light emitting diode LED3 from being erroneously turned on.

Besides, in the case where the control signal S5 and the control signal S6 are High, the driver IC 30 according to the present embodiment pulls in the electric current IDET and the electric current ITHSET, and detects a leakage current. On the other hand, in the case where the control signal S5 and the control signal S6 are Low, the driver IC 30 stops pulling in the electric current IDET and the electric current ITHSET, does not detect a leakage current and holds the state of the control signal S3. Because of this, compared with a case where a leakage current is always detected, it is possible to achieve reduction in the power consumption.

Besides, in the driver IC 30 according to the present embodiment, the switch SW3 is disposed on an electric current route from the battery B4 (power supply) to the light emitting diode LED3 (load); therefore, even if an oxide layer is formed on a surface of the switch SW3, a relatively large current of several hundreds of milliamperes flows at the on-time of the switch SW3; therefore, it is possible to remove the oxide layer by means of the electric current.

Besides, according to the driver IC 30 of the present embodiment, by changing a resistance value of the resistor RSINKSET or resistor RTHSET externally connected to the driver IC 30, it is possible to easily change a detection level for a leakage current.

<Other Modifications>

In the meantime, besides the above embodiments, it is possible to add various modifications to the structure of the present invention without departing from the spirit of the present invention. In other words, It should be understood that the above embodiments are examples in all respects and are not limiting, and the technological scope of the present invention is not indicated by the above description of the embodiments but by the claims, and all modifications within the scope of the claims and the meaning equivalent to the claims are covered.

INDUSTRIAL APPLICABILITY

The present invention is a useful technology to achieve improvement in accuracy of detecting a leakage current in load apparatuses such as a microprocessor, a semiconductor apparatus, an illumination apparatus and the like and in a vehicle that mounts these.

LIST OF REFERENCE NUMERALS 10 driver IC (semiconductor apparatus)
11 leakage current detection circuit
12 drive circuit (control target circuit)
13 reference power supply
14 constant current generation circuit
15 hysteresis voltage generation circuit
16 logic circuit
20 driver IC (semiconductor apparatus)
21 leakage current detection circuit
22 drive circuit (control target circuit)
23 constant voltage source
30 driver IC (semiconductor apparatus)
31 CR timer
32 current mirror circuit
33 logic circuit
34 drive circuit (control target circuit)
100 motorcycle (vehicle)
101 head light
102 rear light
103 winker light
104 winker light
105 switch
B1, B2, B4 batteries
B3, B5 constant voltage sources
SW1, SW2, SW3 switches
D1, D2 diodes
LED1, LED2, LED3 light emitting diodes (loads)
L1 coil
IN1, IN2, IN3 external terminals
OUT1, OUT2, OUTS external terminals
SE1, SE2 external terminals
VCC1 external terminal
STIN, THSET, SINKSET external terminals
CVCC, CVIN capacitors
N1, N2 N channel type MOS field effect transistors P3 P channel type MOS field effect transistor
P11 P channel type MOS field effect transistor
N12-N14 N channel type MOS field effect transistors (first transistor, second transistor)
N31 N channel type MOS field effect transistor
CMP1, CMP2, CMP3 comparators
OPA1, OPA2 operational amlifiers
CS1 constant current source
R1 resistor
R11-R19 resistors (first resistor-fourth resistor)
RTHSET, RSINKSET resistors
RSW leak resistance value
Rth threshold resistance value
V1-V6 voltages (input voltages)
VIN, VCC, VSE voltages (input voltages)
Vth1-Vth4 threshold value voltages
VREG constant voltage
Vst operation enable voltage
I1, I2 electric currents (switch currents)
IIN electric current (switch current)
Ith threshold value current
IDET, ITHSET, ISINKSET, ILED electric currents
INV1, INV2 inverters
S0-S6 control signals
Sdet detection signal

What is claimed is:

1. A leakage current detection circuit, comprising:
a detection signal generation portion that detects a switch current flowing in a switch which is targeted for leakage monitoring, and generates a detection signal to prohibit operation of a control target circuit which is targeted for control when the switch current does not reach a predetermined threshold value, wherein the detection signal generation portion detects an input voltage in accordance with the switch current, and generates the detection signal to prohibit the operation of the control target circuit when the input voltage does not reach a predetermined threshold value voltage, and wherein the switch is disposed on a first electric current route between a load driven by the control target circuit and a power supply that applies a voltage to the load, and the detection signal generation portion detects the input voltage by providing an electric current into a second electric current route different from the first electric current route.

2. The leakage current detection circuit according to claim 1 includes:
a constant current source that generates the switch current; and
a comparator that compares a voltage appearing at one terminal of the switch and a predetermined threshold value voltage with each other to generate the detection signal.

3. The leakage current detection circuit according to claim 1, wherein the input voltage is supplied as a drive voltage for the control target circuit, and the threshold value voltage is set lower than an operation enable voltage of the control target circuit.

4. The leakage current detection circuit according to claim 3 includes:
first, second, and third resistors whose first terminals are connected to an application terminal for the input voltage;
a first transistor of N channel type whose source is connected to a ground terminal, drain is connected to a second terminal of the first resistor, and gate is connected to a second terminal of the second resistor;
a second transistor of N channel type whose source is connected to the ground terminal, drain is connected to the gate of the first transistor, and gate is connected to a second terminal of the third resistor;
a fourth resistor whose first terminal is connected to the gate of the second transistor, and second terminal is connected to the ground terminal; and
an output terminal that outputs a voltage, as the detection signal, which appears between the second terminal of the first resistor and the drain of the first transistor.

5. A semiconductor apparatus comprising:
a leakage current detection circuit according to claim 1; and
a control target circuit of the leakage current detection circuit that is targeted for control.

6. The semiconductor apparatus according to claim 5, wherein
the control target circuit is a drive circuit that drives a load.

7. The semiconductor apparatus according to claim 6, wherein the load is an LED (Light Emitting Diode).

8. An LED illumination apparatus, comprising:
an LED; and
a semiconductor apparatus according to claim 7 that performs drive control of the LED.

9. A vehicle, comprising:
a head light;
a rear light; and
a winker light, wherein
at least one of the head light, the rear light and the winker light is an LED illumination apparatus according to claim 8.

10. A leakage current detection circuit, comprising:
a detection signal generation portion that detects a switch current flowing in a switch which is targeted for leakage monitoring, and generates a detection signal to prohibit operation of a control target circuit which is targeted for control when the switch current does not reach a predetermined threshold value,
wherein the detection signal generation portion detects an input voltage in accordance with the switch current, and generates the detection signal to prohibit the operation of the control target circuit when the input voltage does not reach a predetermined threshold value voltage, and
wherein the leakage current detection circuit further comprises:
first, second, and third resistors whose first terminals are connected to an application terminal for the input voltage;
a first transistor of N channel type whose source is connected to a ground terminal, drain is connected to a second terminal of the first resistor, and gate is connected to a second terminal of the second resistor;
a second transistor of N channel type whose source is connected to the ground terminal, drain is connected to the gate of the first transistor, and gate is connected to a second terminal of the third resistor;
a fourth resistor whose first terminal is connected to the gate of the second transistor, and second terminal is connected to the ground terminal; and
an output terminal that outputs a voltage, as the detection signal, which appears between the second terminal of the first resistor and the drain of the first transistor.

11. The leakage current detection circuit according to claim 10 including:
a constant current source that generates the switch current; and a comparator that compares a voltage appearing at one terminal of the switch and a predetermined threshold value voltage with each other to generate the detection signal.

12. A semiconductor apparatus comprising:
a leakage current detection circuit according to claim 10; and
a control target circuit of the leakage current detection circuit that is targeted for control.

13. The semiconductor apparatus according to claim 12, wherein the control target circuit is a drive circuit that drives a load.

14. The semiconductor apparatus according to claim 13, wherein the load is an LED (Light Emitting Diode).

15. An LED illumination apparatus, comprising:
an LED; and
a semiconductor apparatus according to claim 14 that performs drive control of the LED.

16. A vehicle, comprising:
a head light;
a rear light; and
a winker light, wherein
at least one of the head light, the rear light and the winker light is an LED illumination apparatus according to claim 15.

* * * * *